3,115,473
PROCESS OF PREPARING A POLYETHYLENE CATALYST
Randall G. Heiligmann, Columbus, Ohio, assignor, by mesne assignments, to W. R. Grace & Co., New York, N.Y., a corporation of Connecticut
No Drawing. Filed May 9, 1958, Ser. No. 734,099
2 Claims. (Cl. 252—441)

This invention concerns a novel method of synthesizing polymers of ethylene incorporating the use of a novel titanium catalyst.

More particularly, the invention pertains to forming polyethylene by subjecting ethylene in an inert solvent to the action of a catalyst prepared by subjecting titanium metal as sponge, wire, turnings, powder, or the like, at high temperature to the action of hydrogen chloride.

The titanium-containing catalyst of this invention can be prepared at temperatures ranging from 300° C. up to the melting point of titanium, i.e., 1725° C.; preferably a temperature of about 700° C. or more is used.

The catalyst can be prepared in conventional equipment. For example, a rotatable fused silica tube previously purged with an inert gas (e.g., argon) can be adapted as a container for a bed of discrete titanium particles over or through which a heated stream of hydrogen chloride is passed. Likewise, a fluidized bed reactor can be employed to insure optimum contact of the titanium particles with the heated hydrogen chloride being recycled therethrough. Additional heat can also be supplied, if necessary, from external sources to maintain the preferred reaction temperature. Other equipment which can be utilized is well known to those skilled in the art.

Reaction times for preparing the titanium-containing catalyst is dependent on several factors such as: purity of reactants, degree of solid-gaseous contact, and reaction temperature. Regarding the latter factor, generally speaking the reaction time varies inversely as the temperature. Reaction times from 10 minutes to 10 hours or more have been employed successfully; however, a catalyst-preparing reaction time of about 2 hours is preferred. The catalyst preparation reaction is not carried to completion; therefore there is always present some Ti as metallic titanium in the prepared catalyst of this invention.

The titanium metal-hydrogen chloride reaction can be executed at substantially any total pressure, including subatmospheric pressure, but preferably atmospheric or slightly superatmospheric pressure is used. However, the partial pressure of hydrogen chloride is normally maintained at a fairly low value (about 10 mm. of mercury) to control the degree of chlorination. The carrier gas employed to raise the total pressure to the desired level should be inert or mildly reducing, e.g., hydrogen, helium, argon, methane, or the like.

The thus prepared titanium-containing catalyst particles being insoluble in the solvent are readily separated from the ethylene polymer by conventional physical means, e.g., screening, filtration, or decantation of the ethylene polymer in solution from the solid catalyst particles, thereby allowing for catalyst recycle and reuse in the polymerization reaction, with or without reactivation dependent upon the activity of the used titanium-containing catalyst.

The following examples will aid in explaining but are not to limit the invention.

*Example 1*

Ten g. of titanium metal in the form of sponge were charged into a rotatable fused silica tube previously purged with argon. The tube was heated externally until the temperature inside as measured by a thermocouple was about 800° C. The tube was then rotated and a mixture of hydrogen chloride and hydrogen, preheated to a temperature of about 800° C., was passed through the tube for a period of 4–5 hours. The reaction was discontinued and the titanium-bearing catalyst was cooled in situ in preparation for use as an ethylene polymerization catalyst.

*Example 2*

Ten g. of metallic titanium as discrete particles of about 325 mesh size were placed within a 1-inch I.D. vertical tube 2 feet in length acting as a fluidized bed reactor. The tube was heated by a Nichrome resistance wire wrapped around the outside of the tube and covered with insulation. A powerstat controlled the voltage allowing temperature settings up to 1500° C. After heating the tube to a temperature of about 1200° C. a mixture of hydrogen and hydrogen chloride was recycled therethrough for 2 hours at sufficient velocity to maintain the titanium particles in suspension in the tube after which time the gas velocity was increased for a time period sufficiently long to drive the activated titanium catalyst particles out of the tube reactor and into a collection pot. The reaction was halted and the activated titanium catalyst particles were allowed to cool under argon prior to use in ethylene polymerization.

*Example 3*

Three g. of activated titanium bearing catalyst from Example 1 were transferred to a "dry box" filled with argon and in the inert atmosphere of the "dry box" thereafter charged to a 250 ml. stainless steel bomb having a gas inlet and outlet. Fifty ml. of hexane previously freed of air by boiling in a nitrogen atmosphere and drying over calcium hydride were added to the bomb and the bomb was closed in the "dry box." The bomb was withdrawn therefrom and placed in a heated rocker. The bomb's gas inlet was connected to an ethylene source. The ethylene (99.5%) had been previously purified by agitation with molten sodium at about 150° C. for 8 hours. The bomb was heated to 200° C. and the rocking action initiated. The gas inlet was opened and ethylene under pressure was charged to the bomb. During the polymerization the ethylene partial pressure in the bomb ranged from 500 to 1000 p.s.i.g. and additional ethylene was added from time to time to maintain the ethylene partial pressure at approximately 850 p.s.i.g. After 48 hours the reaction was discontinued and the bomb allowed to cool. After depressurization by opening the gas outlet the contents of the bomb were transferred to a beaker containing methanol-hydrochloric acid solution and boiled to dissolve impurities. The mixture was cooled and the resultant purified polyethylene was filtered and dried. The purified polymer product consisted of 14 g. of polyethylene having a density of 0.962 and a melting point of 132° to 133° C.

*Example 4*

Following the transferring and charging procedure used in Example 3, 3 g. of activated titanium-bearing catalyst from Example 2 were charged to a 250 ml. stainless steel bomb along with 50 ml. of hexane previously freed of air by boiling in a nitrogen atmosphere and drying over calcium hydride. The bomb was heated to 200° C. and pressured to 1000 p.s.i.g. with ethylene pretreated as in Example 3. After rocking the bomb for 48 hours under the above conditions the reaction was halted. After cooling and depressurizing, the bomb was opened, yielding, atfer purification by the method as set forth in Example 3, 14 g. of polyethylene having a density of 0.96 and a melting point of 133–134° C.

In practicing this invention it has been found that ethylene partial pressures of at least about 100 p.s.i. are desirable to cause the reaction to proceed at room temperature (20–30° C.). Preferably, however, at room temperature the ethylene partial pressure is at least 350 p.s.i., or higher. At higher temperatures, it is possible to initiate polymerization at somewhat lower ethylene pressures; e.g., at 200° C. the partial pressure of ethylene can be as low as about 50 p.s.i. Even though there is a minimum combination of temperature and pressure necessary to start polymerization (i.e., the lowest pressure at which polymerization can be initiated at a given temperature, or vice versa), it has been found as a general rule that, once started, polymerization can be continued at lower temperatures and/or ethylene pressures.

Although the reaction can be carried out at relatively high pressures, e.g. 5,000–10,000 p.s.i., and higher, the additional expense of equipment required to withstand such pressures in general outweighs the increased yields and/or shorter reaction time.

For practical purposes, a reaction temperature in the range of 150–225° C. and ethylene partial pressures in the range of 200–1300 p.s.i. are preferred. Under these conditions, polyethylene having a melting point of 130–136° C. and a very low melt index is produced. At higher temperatures, the melting point of the polyethylene formed is decreased and the melt index increased. Thus, it may be seen that variation in reaction temperatures is a means of preparing a series of polyethylene having different physical properties. Other means of varying the polymer molecular weight and crystallinity will be obvious to those skilled in the art.

The amount of catalyst is not critical. Relatively small amounts are operable to form relatively large amounts of polyethylene. In general, a practical range is 0.01–0.2 g. catalyst per gram of ethylene polymerized.

As a polymerization reaction medium, substantially any inert material can be used which is liquid under the conditions of temperature and pressure employed and which has a solvent action on ethylene. Hydrocarbon solvents are preferred and are preferably substantially free of materials that react with Ti compounds, e.g., water, $CO_2$, $O_2$, and similar reactive compounds. Suitable solvents, include pentane, hexane, heptane, cyclohexane, octane, benzene, xylene, toluene, and the like.

The polyethylene so obtained by this invention can be used to make film, pipe, and extruded or molded articles, such as milk bottles, bottle caps, and the like.

I claim:

1. The process of preparing an ethylene polymerization catalyst that comprises subjecting titanium metal for at least 10 minutes to the action of anhydrous hydrogen chloride at a temperature ranging from 500° C. to the melting point of titanium metal, the HCl partial pressure being at least about 10 mm. of mercury, and discontinuing the Ti-HCl reaction before all the Ti is consumed.

2. The process according to claim 1 wherein the temperature is 600° to 800° C.

References Cited in the file of this patent

UNITED STATES PATENTS

| | | |
|---|---|---|
| 2,899,416 | Schreyer | Aug. 11, 1959 |
| 2,962,353 | Haimsohn | Nov. 29, 1960 |

FOREIGN PATENTS

| | | |
|---|---|---|
| 1,132,506 | France | Nov. 5, 1956 |

OTHER REFERENCES

Mellor: Inorganic and Theoretical Chemical, Longmans, Green and Company, 55 5th Avenue, New York, New York, p. 19, vol. VII (1927).